United States Patent
Wu

(10) Patent No.: US 6,695,324 B1
(45) Date of Patent: Feb. 24, 2004

(54) 3-FOLD TYPE FOLDING COLLAPSIBLE GOLF CART

(76) Inventor: David Wu, No. 35-1, Jih Hsin Street, Tu Cheng City, Taipei Hsien (TW)

( * ) Notice: Subject to any disclaimer, the term of this patent is extended or adjusted under 35 U.S.C. 154(b) by 31 days.

(21) Appl. No.: 10/216,294

(22) Filed: Aug. 12, 2002

(51) Int. Cl.[7] .................................................. B62B 1/00
(52) U.S. Cl. ..................... 280/47.315; 280/40; 280/42; 280/652; 280/DIG. 6
(58) Field of Search ................................. 280/652, 655, 280/40, 42, 47.315, 47.17, 47.26, 655.1, 645, 648, 450, 452, 453, 449, 647, 651, DIG. 5, DIG. 6; 224/274

(56) References Cited

U.S. PATENT DOCUMENTS

| | | | | |
|---|---|---|---|---|
| 4,793,622 A | * | 12/1988 | Sydlow | 280/42 |
| 4,946,186 A | * | 8/1990 | Cheng | 280/646 |
| 5,451,072 A | * | 9/1995 | Weng | 280/646 |
| 5,857,684 A | * | 1/1999 | Liao et al. | 280/42 |
| 6,435,539 B1 | * | 8/2002 | Wu | 280/652 |

* cited by examiner

Primary Examiner—Brian L. Johnson
Assistant Examiner—Hau Phan
(74) Attorney, Agent, or Firm—Troxell Law Office PLLC

(57) ABSTRACT

A 3-fold folding collapsible golf cart, which includes an upper rod member, a bottom rod member, and a lower rod member, the lower rod having a top end pivoted to the upper rod member and locked by a locking mechanism and a bottom end coupled to the bottom rod member by a coupling device, the coupling device having a locating frame supported on a torsional spring and adapted for locking the lower rod member in the operative position and, the lower member being disengaged from the locating frame for folding when the user presses the locating frame with a foot to conquer the spring force of the torsional spring.

1 Claim, 7 Drawing Sheets

3-FOLD TYPE FOLDING COLLAPSIBLE GOLF CART

BACKGROUND AND SUMMARY OF THE INVENTION

The present invention relates to a golf cart and, more particularly, to a 3-fold type folding collapsible golf cart.

FIG. 1 shows a folding collapsible golf cart according to the prior art. This structure of folding collapsible golf cart comprises an intermediate frame unit 8, the intermediate frame unit 8 having a main rod member 82 holding an upper bag cradle 81, a front frame unit 7, the front frame unit 7 having a rod member 71 axially slidably inserted into the main rod member 82 of the intermediate frame unit 8 and selectively locked by a lock screw 70, a rear frame unit 9, the rear frame unit 9 having a rod member 92 pivoted to the rear end of the main rod member 82 of the intermediate frame unit 8 and holding a rear bag cradle 91 and locked by a locking mechanism. This structure of 3-fold type folding collapsible golf cart has numerous drawbacks as outlined hereinafter.

1. The lock screw 70 wears quickly with use because it frequently receives vibrations from the folding collapsible golf cart when the folding collapsible carrying a golf bag 80 and moving in the golf court.
2. The heads 901 of the golf clubs 90 carried in the golf bag 80 tend to be forced against the rod member 71 of the front frame unit 7 when moving the folding collapsible golf cart in the golf court, thereby causing noises.
3. When receiving the intermediate frame unit 8 and the rear frame unit 9 (see FIGS. 2~4), the user shall have to turn the locking lever of the locking mechanism upwards to release the hook of the locking mechanism from the rear frame unit 9. This procedure of collapsing the golf cart is complicated.

The present invention has been accomplished to provide a folding collapsible golf cart, which eliminates the drawbacks of the aforesaid prior art design. It is one object of the present invention to provide a folding collapsible golf cart, which requires less storage space when collapsed. It is another object of the present invention to provide a folding collapsible golf cart, which can easily be set between the extended (operative) position and the received (non-operative) position. According to one aspect of the present invention, the 3-fold type folding collapsible golf cart comprises an upper rod member holding a handle and an upper bag cradle, a bottom rod member holding a lower bag cradle, two wheel assemblies, and a lower rod member. The lower rod has a top end pivoted to the upper rod member and locked by a locking mechanism, and a bottom end coupled to the bottom rod member by a coupling device. The coupling device comprises a torsional spring, and a locating frame supported on the torsional spring and adapted for locking the lower rod member in the operative position. The lower member is disengaged from the locating frame for folding when the user pressed the locating frame with the foot to conquer the spring force of the torsional spring. According to another aspect of the present invention, the wheel assemblies each comprise a wheel axle supporting a wheel and coupled to a slide at the bottom rod member by a respective link, and a connecting tube. The connecting tube has one end fixedly fastened to the respective wheel axle, and the other end pivoted to the coupling device. The slide has a top side coupled to the lower rod member by a link, and two opposite lateral sides respectively coupled to the wheel axles of the wheel assemblies by a respective link. Therefore, the wheel assemblies are turned toward each other and received when the lower rod member is unlocked and turned toward the bottom rod member.

DETAILED DESCRIPTION OF THE PREFERRED EMBODIMENT

Figure 1:
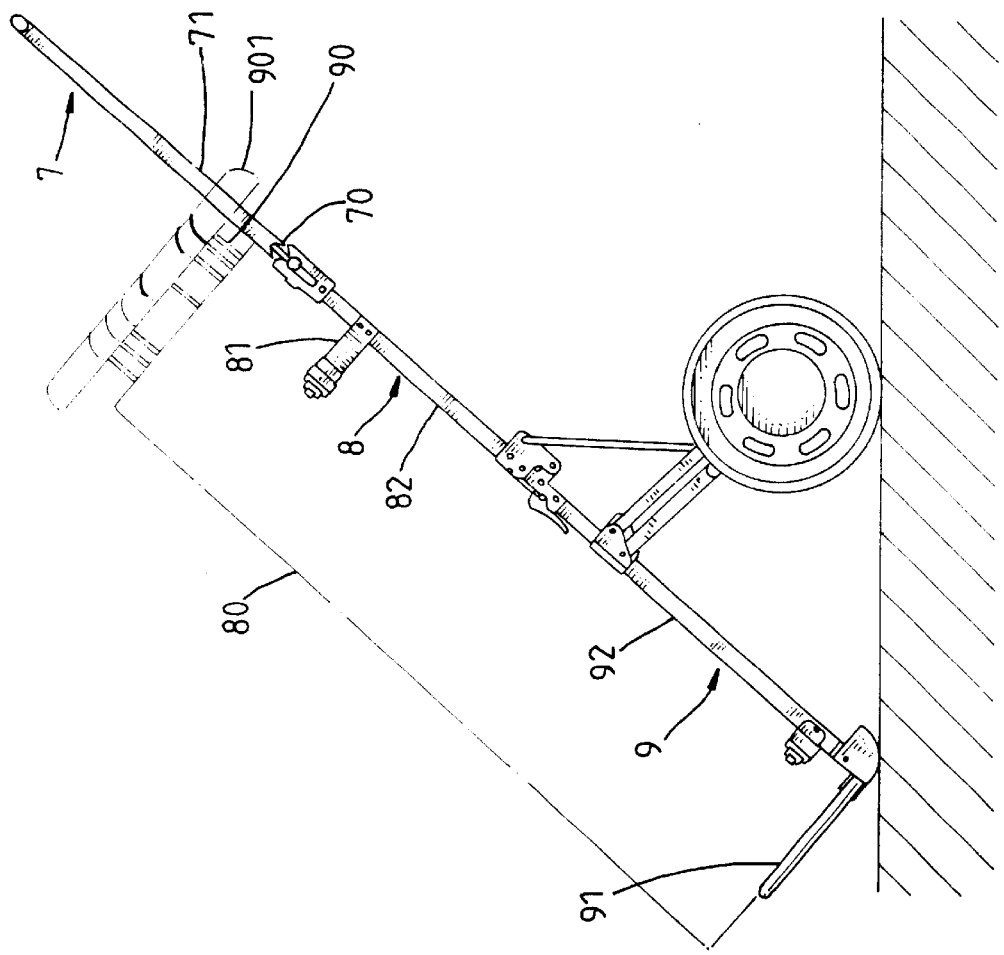
FIG. 1 is a side view of a 3-fold type folding collapsible golf cart according to the prior art.
Figure 4:
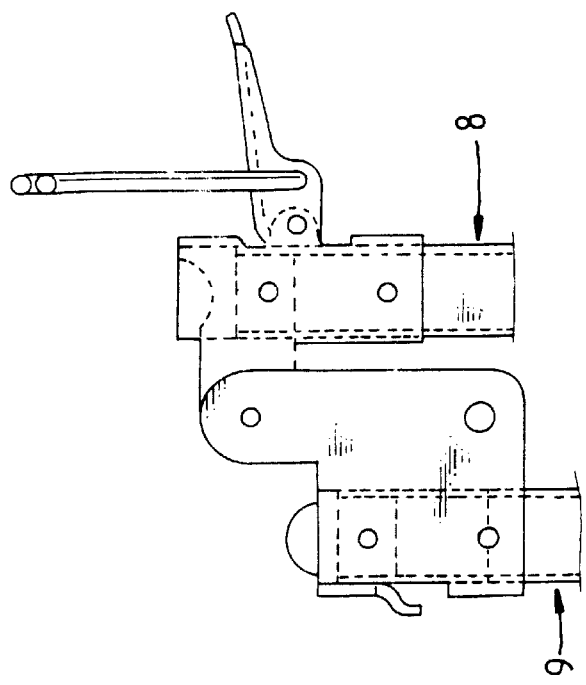
FIG. 4 is a perspective view of a part of the prior art 3-fold type folding collapsible golf cart, showing the locking mechanism unlocked.
Figure 3:
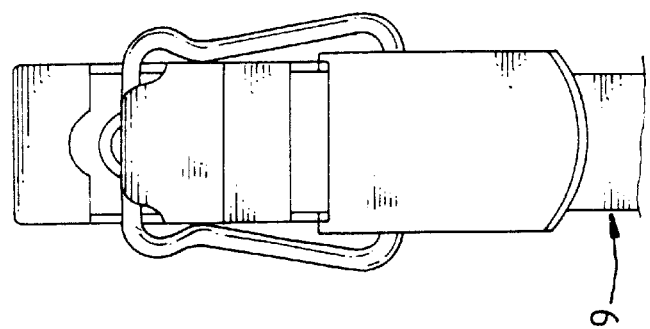
FIG. 3 is a front view of a part of the prior art 3-fold type folding collapsible golf cart.
Figure 2:
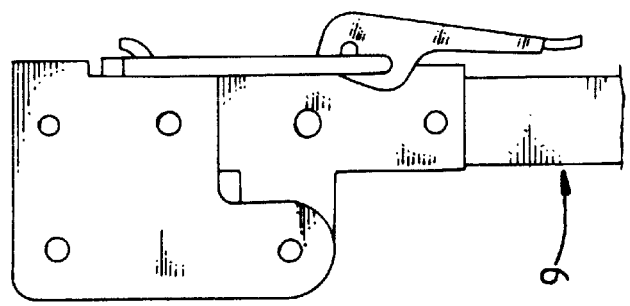
FIG. 2 is a side view of a part of the prior art 3-fold type folding collapsible golf cart.

Referring to FIGS. from 5 through 7, a 3-fold type folding collapsible golf cart in accordance with the present invention is shown comprised of an upper rod member 1, an upper bag cradle 11, a lower rod member 2, a left wheel axle 31, a right wheel axle 32, two wheels 33 and 34, a lower bag cradle 12, a coupling device 4, and a bottom rod member 5.

The upper rod member 1 has a front end provided with a handle 16, and a rear end pivoted to one end, namely, the front end of the lower rod member 2 and locked by a locking mechanism 10. When the locking lever 101 of the locking mechanism 10 turned to the unlocking position, the upper rod member 1 can be turned downwardly backwards and closely attached to the lower rod member 2. The upper bag cradle 11 is fixedly mounted on the lower rod member 2 near the front end of the lower rod member 2. The wheels 33 and 34 are respectively pivoted to the left wheel axle 31 and the right wheel axle 32. The lower bag cradle 12 is fixedly mounted on the bottom rod member 5.

Figure 7:
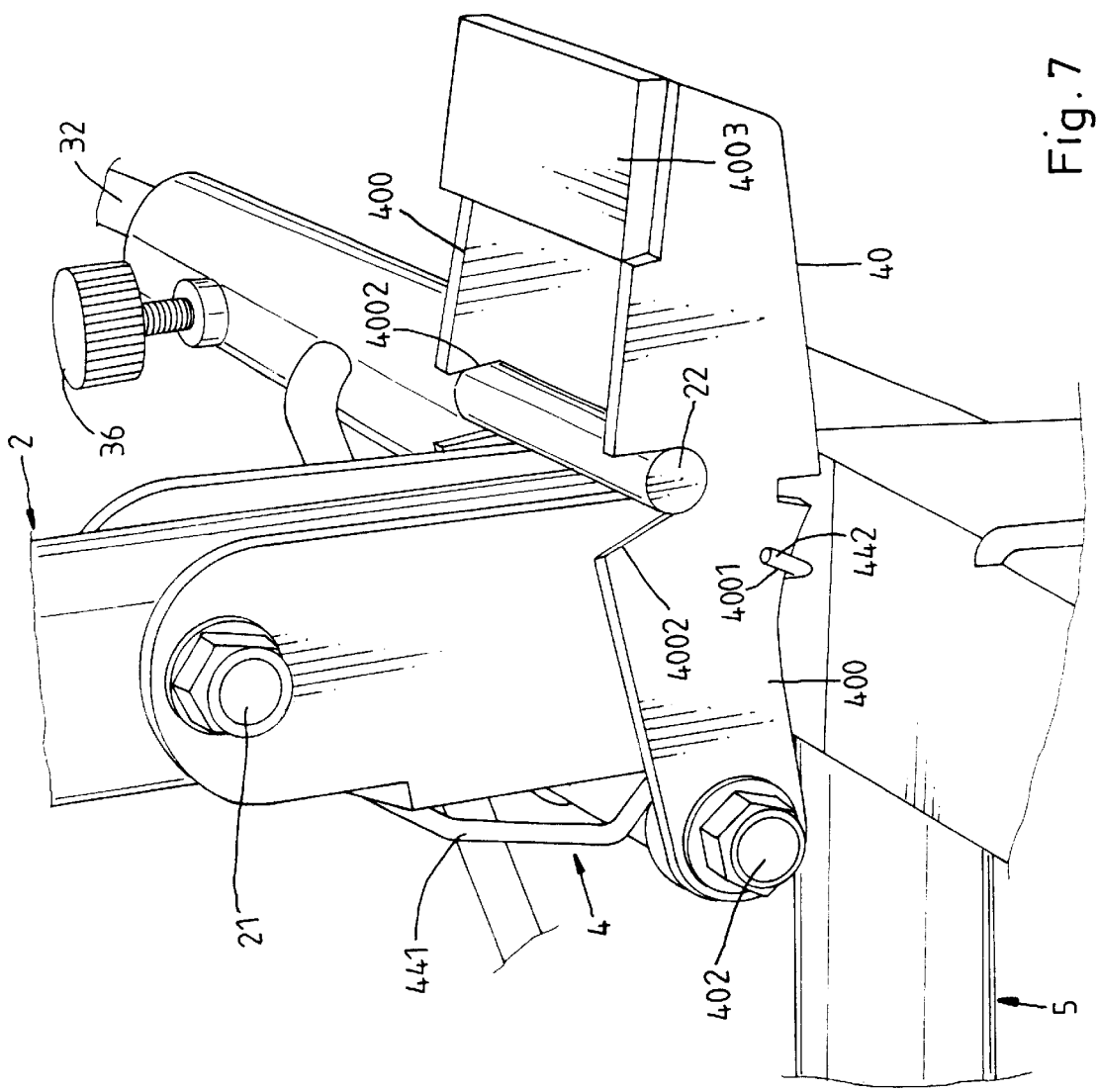
FIG. 7 is an enlarged view of a part of the present invention.

The main features of the present invention are outlined hereinafter. The coupling device 4 comprises a top upright lug 41, a locating frame 40 coupled thereto, a torsional spring 44, and two horizontal side lugs 42 and 43. The locating frame 40 has two parallel sidewalls 400, a shaft 402 connected between the rear ends of the parallel sidewalls 400, two top locating notches 4002 respectively disposed in the sidewalls 400 at the top, and a footplate 4003 connected between the front ends of the parallel sidewalls 400. The torsional spring 44 is mounted on the shaft 402, having a protruded middle part 441 stopped at the top upright lug 41 and two hooked ends 442 respectively hooked on the bottom edges 4001 of the parallel sidewalls 400. The lower rod member 2 has a part near the rear end thereof pivoted to the top upright lug 41 of the coupling device 4 by a pivot 21, and a transverse locating rod 22 fixedly fastened to the rear end and adapted for engaging into the top locating notches 4002 of the locating frame 40 of the coupling device 4 (see also FIG. 7). Further, the rear end of the lower rod member 2 is coupled to one end, namely, the top end 612 of an intermediate link 61. When pressed the footplate 4003 downwards with the foot, the locating frame 40 is moved downwards to disengage the locating notches 4002 from the transverse locating rod 22 of the lower rod member 2. Two connecting tubes 37 and 38 are provided, each having an inner end respectively pivoted to the side lugs 42 and 43 of the coupling device 4 and an outer end respectively sleeved onto the wheel axles 31 and 32 and fixedly secured thereto by a respective lock screw 35 or 36. The bottom rod member 5 is mounted with a slide 50. The slide 50 has a top side 501 coupled to the bottom end 611 of the intermediate link 61, and two opposite lateral sides 502 and 503 respectively coupled to the bottom ends 621 and 631 of two side links 62 and 63. The top ends 622 and 632 of two side links 62 and 63 are respectively coupled to the wheel axles 31 and 32.

Figure 5:
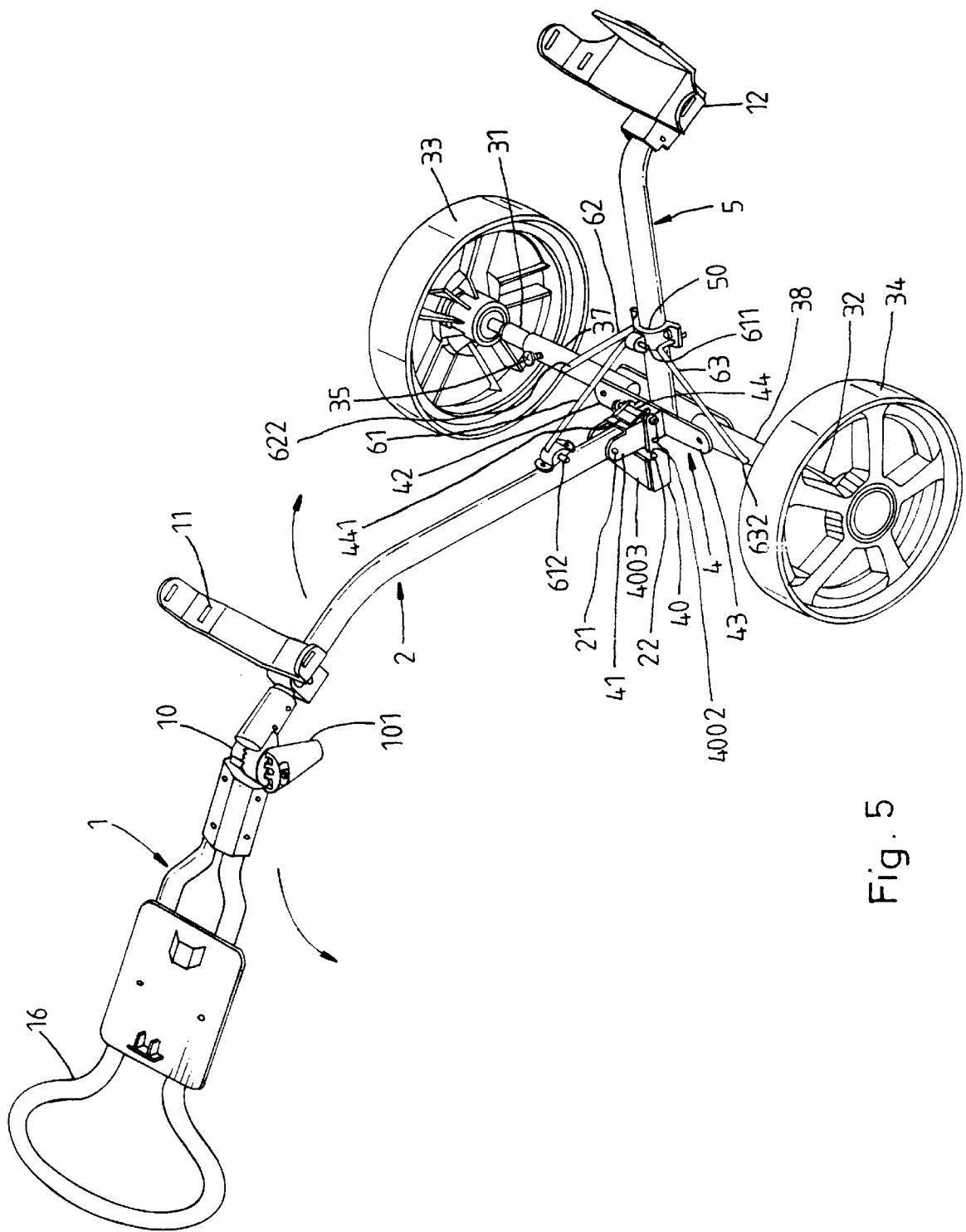
FIG. 5 is an elevational view of a 3-fold type folding collapsible golf cart according to the present invention.
Figure 8:
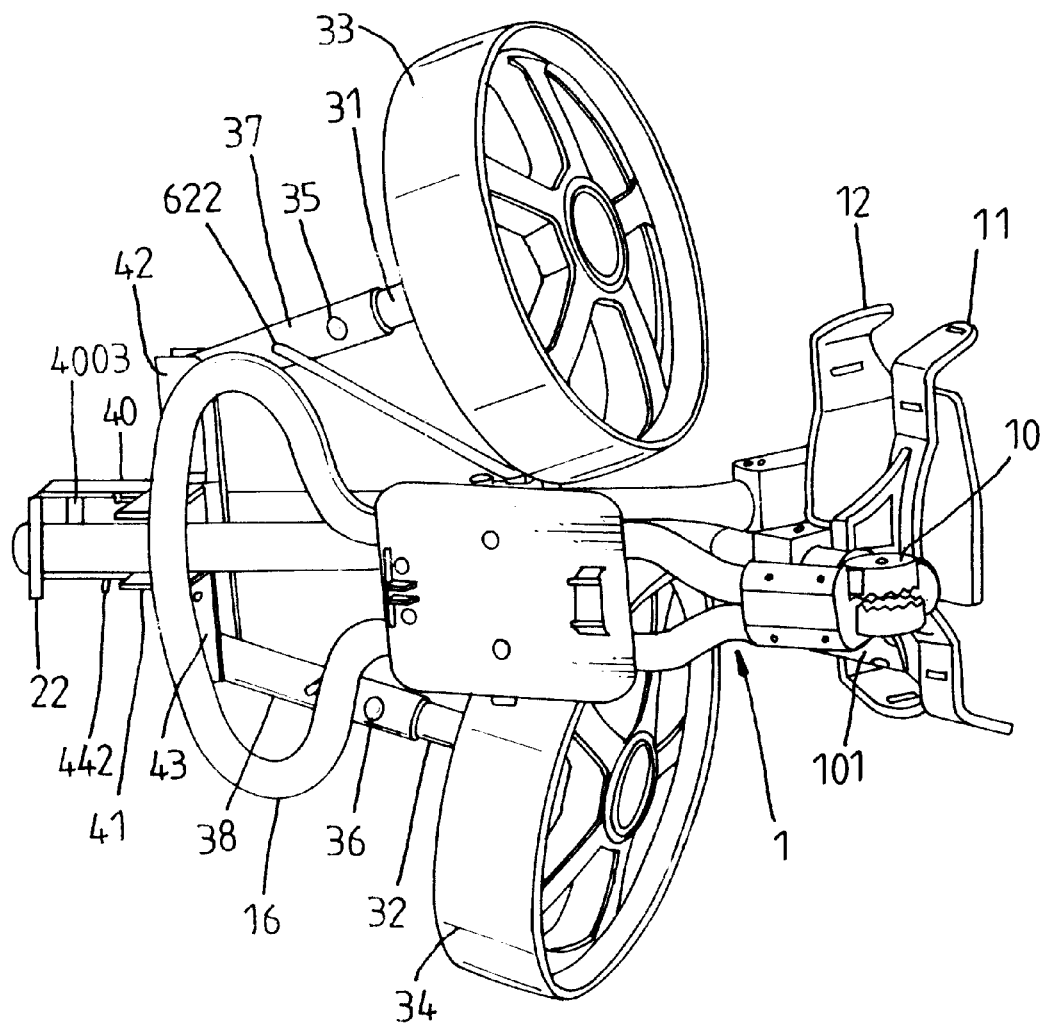
FIG. 8 illustrates the 3-fold type folding collapsible golf cart collapsed according to the present invention.
Figure 9:
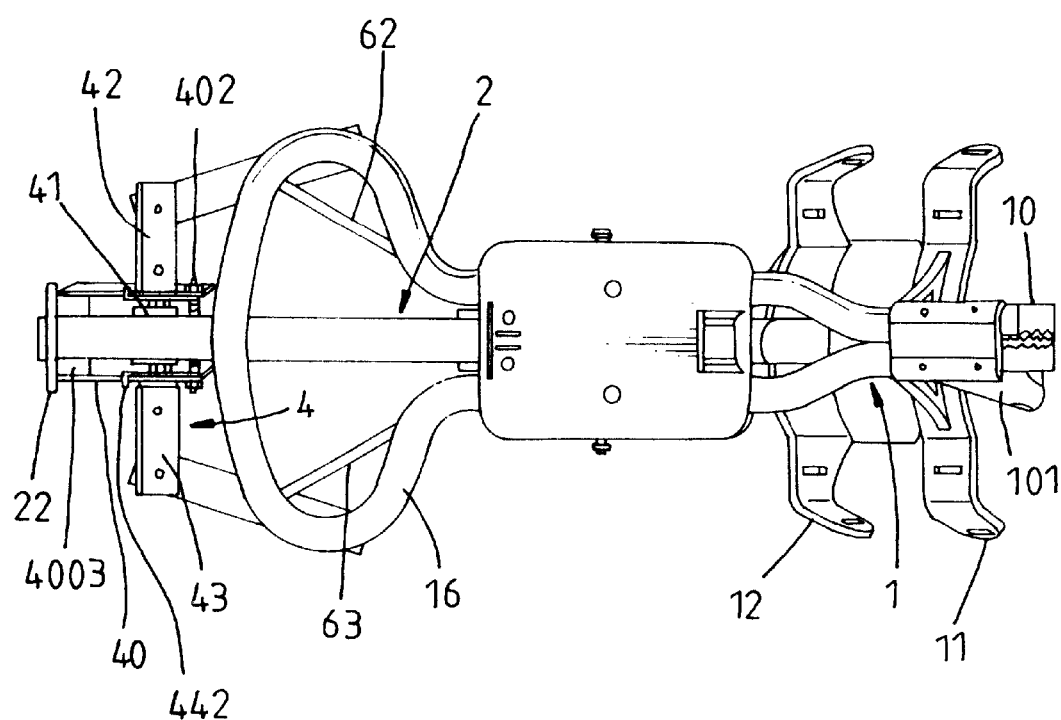
FIG. 9 illustrates the 3-fold type folding collapsible golf cart collapsed after removal of the wheels according to the present invention.

When receiving the 3-fold folding collapsible golf cart, move the locking lever 101 of the locking mechanism 10 from the locking position to the unlocking position for enabling the upper rod member 1 to be turned downwardly backwards and received to the lower rod member 2 (see the directional indication of the upper arrow shown in FIG. 5), and then press the footplate 4003 downwards with the foot to disengage the locating frame 40 from the transverse locating rod 22 of the lower rod member 2, for enabling the lower rod member 2 to be turned with the collapsed upper rod member 1 about the pivot 21 toward the bottom rod member 5 (see the directional indication of the lower arrow shown in FIG. 5). When the lower rod member 2 turned with the collapsed upper rod member 1 toward the bottom rod member 5, the side links 62 and 63 are forced to move the wheels 33 and 34 toward each other to the collapsed status (see FIG. 8).

Figure 6:
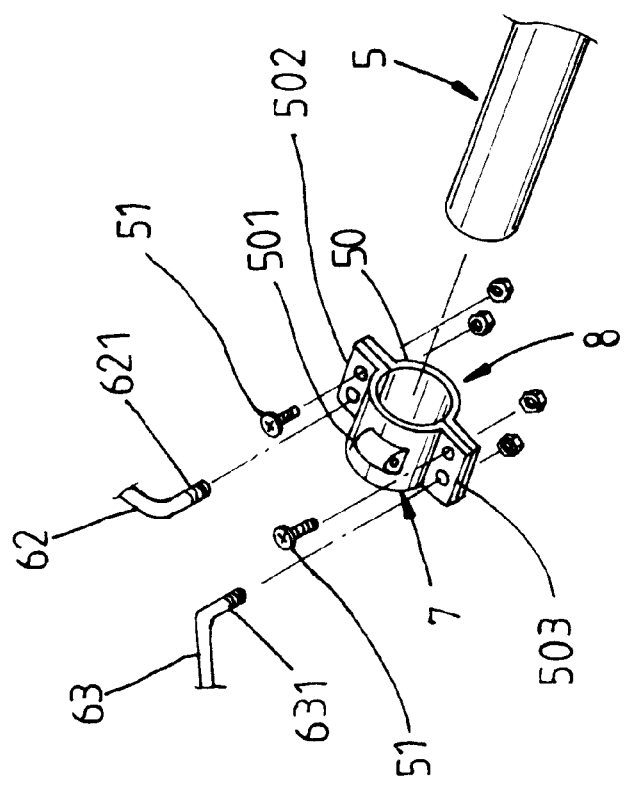
FIG. 6 is an exploded view of a part of the present invention.

Referring to FIG. 6 again, the slide 50 is comprised of two symmetrical half shells 7 and 8 fixedly fastened together by fastening devices, for example, screws 51.

Although the present invention has been explained in relation to its preferred embodiment, it is to be understood that many other possible modifications and variations can be made without departing from the spirit and scope of the invention as hereinafter claimed.

What is claimed is:

1. A 3-fold type folding collapsible golf cart comprising:

an upper rod member, said upper rod member having a front end provided with a handle, and a rear end;

a lower rod member holding an upper bag cradle, said lower rod member having a front end pivoted to the rear end of said upper rod member, and a rear end;

a locking mechanism adapted for locking the rear end of said upper rod member and the front end of said lower rod member;

a bottom rod member, said bottom rod member having a front end coupled to the rear end of said lower rod member and a rear end mounted with a lower bag cradle;

a coupling device coupled between the rear end of said lower rod member and the front end of said bottom rod member, and two wheel assemblies coupled to said coupling device at two sides, said wheel assemblies each comprising a wheel axle and a wheel pivoted to said wheel axle;

wherein:

said coupling device comprises a top upright lug, a pivot mounted in said top upright lug, a locating frame coupled thereto, a torsional spring, and two horizontal side lugs, said locating frame having two parallel sidewalls, a shaft connected between rear ends of said parallel sidewalls, two top locating notches respectively disposed in said parallel sidewalls, and a footplate connected between front ends of said parallel sidewalls, said torsional spring being mounted on said shaft, said torsional spring having a protruded middle part stopped at said top upright lug and two hooked ends respectively hooked on said parallel sidewalls;

said lower rod member is pivoted to the pivot at the top upright lug of said coupling device, having a transverse locating rod fixedly fastened to the rear end thereof and adapted for engaging into the top locating notches of said locating frame of said coupling device;

said wheel assemblies each further comprise a connecting tube, said connecting tube having an inner end respectively pivoted to one side lug of said coupling device and an outer end respectively sleeved onto the respective wheel axle and fixedly secured thereto by a respective fastening element;

said bottom rod member is mounted with a slide, said slide having a top part coupled to said lower rod member by a link, and two opposite lateral sides respectively coupled to the wheel axles of said wheel assemblies by a respective link;

when pressing the footplate of said coupling device downwards with a foot, said locating frame is moved downwards to disengage the locating notches from said transverse locating rod of said lower rod member, for enabling said lower rod member to be turned about said pivot toward said bottom rod member.

* * * * *